United States Patent
Shao et al.

(10) Patent No.: US 11,982,410 B2
(45) Date of Patent: May 14, 2024

(54) METHODS AND SMART GAS INTERNET OF THINGS (IOT) SYSTEMS FOR REMOTE CONTROL OF ULTRASONIC METERING DEVICES

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yaqiang Quan, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/454,766

(22) Filed: Aug. 23, 2023

(65) Prior Publication Data

US 2024/0003501 A1    Jan. 4, 2024

(30) Foreign Application Priority Data

Jul. 10, 2023   (CN) .......................... 202310834657.7

(51) Int. Cl.
*F17D 5/02* (2006.01)
*G01F 1/66* (2022.01)
*G01F 15/063* (2022.01)

(52) U.S. Cl.
CPC ................. *F17D 5/02* (2013.01); *G01F 1/66* (2013.01); *G01F 15/063* (2013.01)

(58) Field of Classification Search
None
See application file for complete search history.

(56) References Cited

U.S. PATENT DOCUMENTS

2006/0077093 A1    4/2006   Steinbauer
2018/0024562 A1    1/2018   Bellaiche

FOREIGN PATENT DOCUMENTS

| CN | 203203696 U | 9/2013 |
| CN | 103778466 A | 5/2014 |
| CN | 110375787 A | 10/2019 |
| CN | 111474510 A | 7/2020 |

(Continued)

OTHER PUBLICATIONS

Notification to Grant Patent Right for Invention in Chinese Application No. 202310634657.7 dated Sep. 7, 2023, 6 pages.

(Continued)

*Primary Examiner* — Harshad R Patel
(74) *Attorney, Agent, or Firm* — METIS IP LLC

(57) ABSTRACT

Embodiments of the present disclosure provide a method and a smart gas Internet of Things (IoT) system for remote control of an ultrasonic metering device. The method is implemented based on a smart gas device management platform of the IoT system and comprises: obtaining metering data of at least one ultrasonic metering device; determining any one of the at least one ultrasonic metering device as a current metering device; determining an accuracy of the current metering device through verifying the current metering device based on metering data of the current metering device and metering data of a related metering device; and sending an adjustment instruction to a target metering device based on the accuracy of at least one current metering device corresponding to the at least one ultrasonic metering device.

8 Claims, 4 Drawing Sheets

(56) References Cited

FOREIGN PATENT DOCUMENTS

| CN | 115358432 A | 11/2022 |
|---|---|---|
| CN | 116346864 A | 6/2023 |

OTHER PUBLICATIONS

First Office Action in Chinese Application No. 202310834657.7 dated Aug. 16, 2023, 24 pages.

Shao, Zehua, Adaptability of Ultrasonic Gas Meter in Field of Household Gas Metering, Gas & Heat, 2018, 7 pages.

Quan, Yaqiang et al., Uncertainty Evaluation of Leakage Rate of Verification Gas Path System for Gas Meter, Gas & Heat, 2023, 5 pages.

Dong, Xue, Research on Error Source and Control of Body in White Based on OCMM Data, Full-text Database of Excellent Master's Dissertations in China (Engineering Science and Technology I), 2017, 113 pages, Part One, p. 1-50.

Dong, Xue, Research on Error Source and Control of Body in White Based on OCMM Data, Full-text Database of Excellent Master's Dissertations in China (Engineering Science and Technology I), 2017, 113 pages, Part Two, p. 51-113.

Li, Yukun, The Performance Analysis and Stability Compensation Experiment of 3-UPS/S Parallel Stability Platform, Chinese Doctoral Dissertation Full-text Database (Engineering Science and Technology II), 2018, 111 pages, Part One, p. 1-50.

Li, Yukun, The Performance Analysis and Stability Compensation Experiment of 3-UPS/S Parallel Stability Platform, Chinese Doctoral Dissertation Full-text Database (Engineering Science and Technology II), 2018, 111 pages, Part One, p. 51-111.

Li, Mingming et al., Calibration and error analysis for polarized-light navigation sensor, 2011 International Conference on Electric Information and Control Engineering, 2011, 5 pages.

METHODS AND SMART GAS INTERNET OF THINGS (IOT) SYSTEMS FOR REMOTE CONTROL OF ULTRASONIC METERING DEVICES

CROSS-REFERENCE TO RELATED APPLICATIONS

This application claims the priority of the Chinese Patent Application No. 202310834657.7, filed on Jul. 10, 2023, the entire contents of which are incorporated herein by reference.

TECHNICAL FIELD

The present disclosure relates to the field of Internet of Things technology, and in particular to a method and a smart gas Internet of Things (IoT) system for remote control of an ultrasonic metering device.

BACKGROUND

With the widespread use of gas in life, ultrasonic metering devices are increasingly used in gas metering management. A plurality of ultrasonic metering devices installed in a gas pipeline may measure and monitor a gas flow rate in the gas pipeline. However, for ultrasonic metering devices, there are still problems in terms of lagging remote control, low intelligence, and low management efficiency of the accuracy of ultrasonic metering devices.

Therefore, it is desired to provide a method and a smart gas Internet of Things (IoT) system for remote control of an ultrasonic metering device, which may remotely control the ultrasonic metering device and improve the management efficiency and intelligence of the accuracy of the ultrasonic metering device.

SUMMARY

One of the embodiments of the present disclosure provides a method for remote control of an ultrasonic metering device, wherein the method is implemented by a smart gas device management platform of an Internet of Things (IoT) system for remote control of the ultrasonic metering device, and the method includes: obtaining metering data of at least one ultrasonic metering device; determining any one of the at least one ultrasonic metering device as a current metering device; determining an accuracy of the current metering device through verifying current metering device based on the metering data of the current metering device and metering data of a related metering device, wherein the related metering device includes at least one of an upper metering device, a lower metering device, and a parallel metering device of the current metering device; and sending an adjustment instruction to a target metering device based on the accuracy of at least one current metering device corresponding to the at least one ultrasonic metering device.

One of the embodiments of the present disclosure provides an Internet of Things (IoT) system for remote control of an ultrasonic metering device, wherein the IoT system includes a smart gas user platform, a smart gas service platform, a smart gas device management platform, a smart gas sensing network platform, and a smart gas object platform, wherein the smart gas user platform includes a plurality of smart gas user sub-platforms; the smart gas service platform includes a plurality of smart gas service sub-platforms; the smart gas device management platform includes a plurality of smart gas device sub-platforms and a smart gas data center, the smart gas device management platform being configured to transmit an adjustment instruction to the smart gas sensing network platform via the smart gas data center; the smart gas sensing network platform is configured to interact with the smart gas data center and the smart gas object platform, and send the adjustment instruction to the smart gas object platform; the smart gas object platform is configured to obtain metering data of at least one ultrasonic metering device; the smart gas device management platform is configured to: determine any one of the at least one ultrasonic metering device as a current metering device; determine an accuracy of the current metering device through verifying the current metering device based on the metering data of the current metering device and metering data of a related metering device, wherein the related metering device includes at least one of an upper metering device, a lower metering device, and a parallel metering device of the current metering device; and send the adjustment instruction to a target metering device based on the accuracy of at least one current metering device corresponding to the at least one ultrasonic metering device.

One of the embodiments of the present disclosure provides a non-transitory computer-readable storage medium, wherein the storage medium stores computer instructions, and when a computer reads the computer instructions in the storage medium, the computer implements the method for remote control of the ultrasonic metering device.

BRIEF DESCRIPTION OF THE DRAWINGS

The present disclosure will be further illustrated by way of exemplary embodiments, which will be described in detail by way of the accompanying drawings. These embodiments are not limiting, and in these embodiments the same numbering indicates the same structure, wherein.

DETAILED DESCRIPTION

Figure 1:
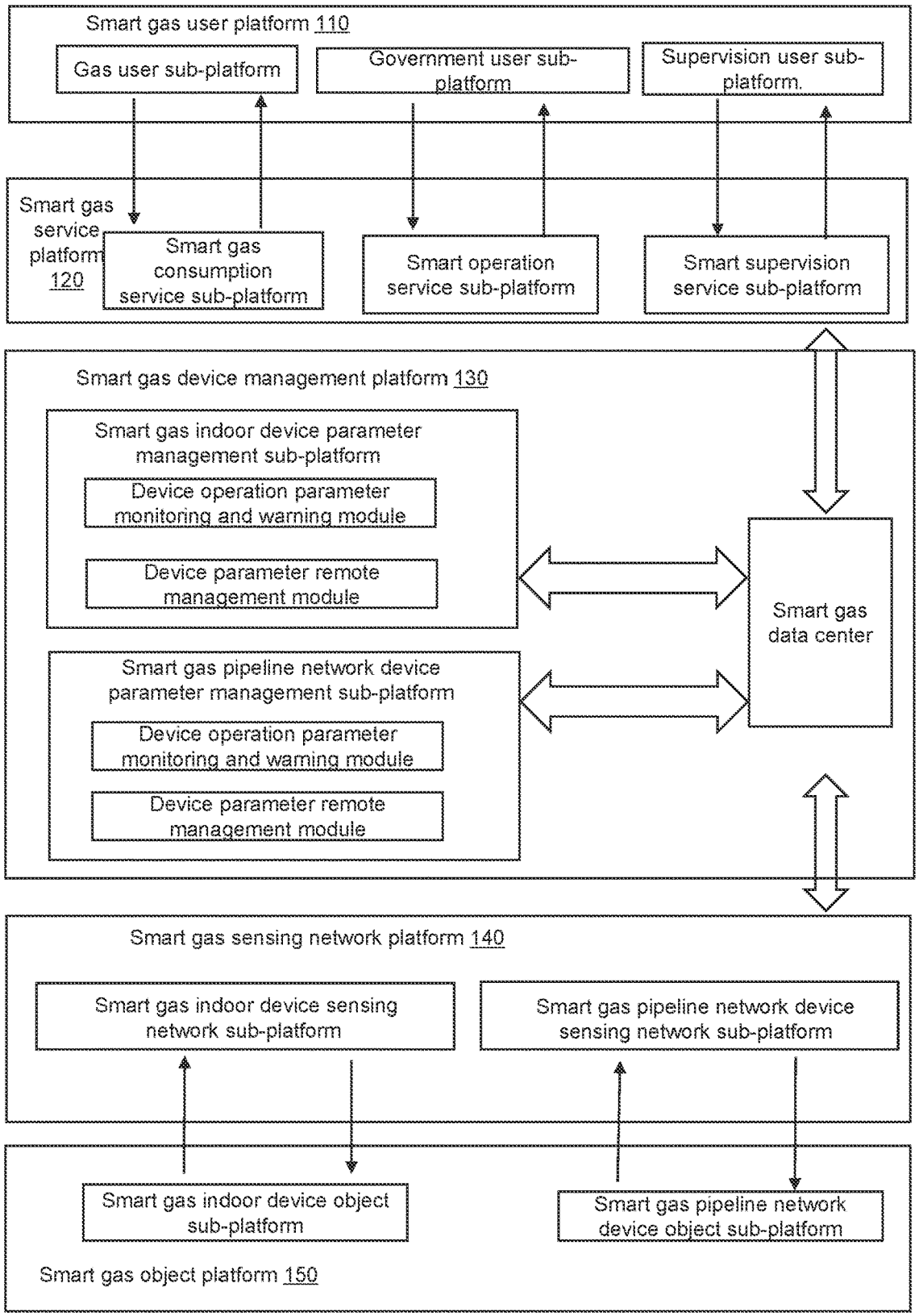
FIG. 1 is a diagram of a structure of platforms of an Internet of Things (IoT) system for remote control of an ultrasonic metering device according to some embodiments of the present disclosure.

In order to more clearly illustrate the technical solutions of the embodiments of the present disclosure, the following will be a brief description of the accompanying drawings that need to be used in the description of the embodiments. It will be apparent that the accompanying drawings in the following description are only examples or embodiments of the present disclosure, and that other similar scenarios may be applied to the present disclosure by those of ordinary skill in the art, without creative effort. Unless obviously obtained from the context or the context illustrates otherwise, the same numeral in the drawings refers to the same structure or operation.

Flowcharts are used throughout the present disclosure to illustrate the operations performed by the system according to embodiments of the present disclosure. It should be understood that the preceding or following operations are not necessarily performed in exact order. Instead, the individual steps may be processed in reverse order or simultaneously. It is also possible to add other operations to these procedures or remove a step or steps from them.

Some embodiments of the present disclosure evaluate accuracies of the ultrasonic metering devices based on the received metering data of a plurality of ultrasonic metering devices; and send control instructions (such as a data upload frequency and a parameter adjustment instruction) to the metering devices according to the accuracies of the metering devices, enabling remote control of the ultrasonic metering devices.

FIG. 1 is a diagram of a structure of platforms of an Internet of Things (IoT) system for remote control of an ultrasonic metering device according to some embodiments of the present disclosure.

As shown in FIG. 1, an IoT system 100 for remote control of a metering device may include a smart gas user platform 110, a smart gas service platform 120, a smart gas device management platform 130, a smart gas sensing network platform 140, and a smart gas object platform 150 connected in sequence.

The smart gas user platform may be a platform configured to interact with users. In some embodiments, the smart gas user platform may be configured as a terminal device.

In some embodiments, the smart gas user platform may include a plurality of smart gas user sub-platforms, for example, a gas user sub-platform, a supervision user sub-platform, and a government user sub-platform.

The gas user sub-platform may be configured to provide gas users with relevant data on gas usage and solutions to gas problems. The supervision user sub-platform may be configured to supervise operations of the entire IoT system 100 for remote control of the ultrasonic metering device. The government user sub-platform may be a platform that provides government users with data related to gas operations.

In some embodiments, the smart gas user platform may send gas device parameter management information (e.g., metering data of the metering device, etc.) to a gas user through the gas user sub-platform. Details about the metering data of the metering device may be found in FIG. 2 and its related contents.

The smart gas service platform may be a platform for receiving and transmitting data and/or information such as advisory information, query instructions, troubleshooting solutions, etc. The smart gas service platform may obtain the gas device parameter management information, etc. from a smart gas safety management platform (e.g., a smart gas data center) and send the gas device parameter management information to the smart gas user platform.

In some embodiments, the smart gas service platform may include a plurality of smart gas service sub-platforms, for example, a smart gas consumption service sub-platform, a smart supervision service sub-platform, and a smart operation service sub-platform. Different smart gas service sub-platforms correspond to and interact with different smart gas user sub-platforms.

The smart gas service sub-platform may be a platform that provides gas services for the gas users.

The smart supervision service sub-platform may be a platform that provides safety supervision service needs for supervisory users.

The smart operation service sub-platform may be a platform that provides the government users with relevant information on gas operations.

In some embodiments, the smart gas service platform may send the metering device parameter management information to the government user sub-platform based on the smart operation service sub-platform.

The smart gas device management platform refers to a platform that overall plans and coordinates connections and collaborations among various functional platforms, converges all information of the IoT system, and provides perception management and control management functions for operations of the IoT system.

In some embodiments, the smart gas device management platform may include the smart gas data center and a plurality of smart gas device management sub-platforms, for example, a smart gas indoor device parameter management sub-platform and a smart gas pipeline network device parameter management sub-platform.

The smart gas indoor device parameter management sub-platform may be a platform for managing smart gas indoor devices. In some embodiments, the smart gas indoor device parameter management sub-platform may include but is not limited to, a device operation parameter monitoring and warning module and a device parameter remote management module. The smart gas indoor device parameter management sub-platform may analyze and process data related to smart gas indoor devices through the aforementioned modules.

The smart gas pipeline network device parameter management sub-platform may be a platform configured to manage the smart gas pipeline network device. In some embodiments, the smart gas pipeline network device parameter management sub-platform may include but is not limited to, a device operation parameter monitoring and warning module and a device parameter remote management module. The smart gas pipeline network device parameter management sub-platform may analyze and process data related to the smart gas pipeline network device through the aforementioned modules.

The smart gas data center may be configured to store and manage all operation information of the IoT system 100 for remote control of the ultrasonic metering device. In some embodiments, the smart gas data center may be configured as a storage device for storing related data of parameter management of indoor device and pipeline network device, etc. For example, the related data may be management data of parameters on metering device, including monitoring data on the operation of the metering device in the gas pipeline.

In some embodiments, the smart gas device management platform may determine any one of at least one ultrasonic metering device as a current metering device; determine an accuracy of the current metering device through verifying the current metering device based on the metering data of the current metering device and metering data of a related metering device; send an adjustment instruction to a target metering device based on the accuracy of at least one current metering device corresponding to the at least one ultrasonic metering device; and upload the adjustment instruction to the smart gas sensing network platform through the smart gas data center. More about the above section may be found in FIG. 2 and its related description.

In some embodiments, the smart gas device management platform may interact with the smart gas service platform and the smart gas sensing network platform through the smart gas data center for information interaction, respectively. For example, the smart gas data center may send the related data of the parameter management of the indoor device and pipeline network device to the smart gas service platform. As another example, the smart gas data center may send instructions to the smart gas sensing network platform to obtain the related data of the parameter management of the indoor device and pipeline network device.

The smart gas sensing network platform may be a functional platform for managing sensing communication. In some embodiments, the smart gas sensing network platform may perform functions of sensing information sensing communication and control information sensing communication.

In some embodiments, the smart gas sensing network platform may include a smart gas indoor device sensing network sub-platform and a smart gas pipeline network device sensing network sub-platform, which may be configured to obtain operation information of a gas indoor device and a gas pipeline network device, respectively.

In some embodiments, the smart gas sensing network platform may interact with the smart gas data center and the smart gas object platform. For example, the smart gas sensing network platform transmits adjustment instructions to the smart gas object platform.

The smart gas object platform may be a functional platform for generating sensing information and executing control information. For example, the smart gas object platform monitors and generates the operation information of the gas pipeline network device.

In some embodiments, the smart gas object platform may be configured to obtain the metering data of the at least one ultrasonic metering device.

In some embodiments, the smart gas object platform may include a smart gas indoor device object sub-platform and a smart gas pipeline network device object sub-platform.

In some embodiments, the smart gas indoor device object sub-platform may be configured as various types of gas indoor devices (e.g., ultrasonic gas meters, ultrasonic flow meters, etc.) for the gas users.

In some embodiments, the smart gas pipeline network device object sub-platform may be configured as various types of gas pipeline network devices and monitoring devices. For example, the pipeline network devices may include gas pipelines, pressure regulating stations, etc., of the pipeline network, and the monitoring devices may include flow meters configured in the gas pipeline, etc.

Based on the IoT system 100 for remote control of the ultrasonic metering device, a closed loop of information operation may be formed between the smart gas object platform and the smart gas user platform, facilitating coordinated and regulated operations under unified management of the IoT system 100 for remote control of the ultrasonic metering device, thus realizing digitized and intelligent parameter management of the indoor device and pipeline network device.

Figure 2:
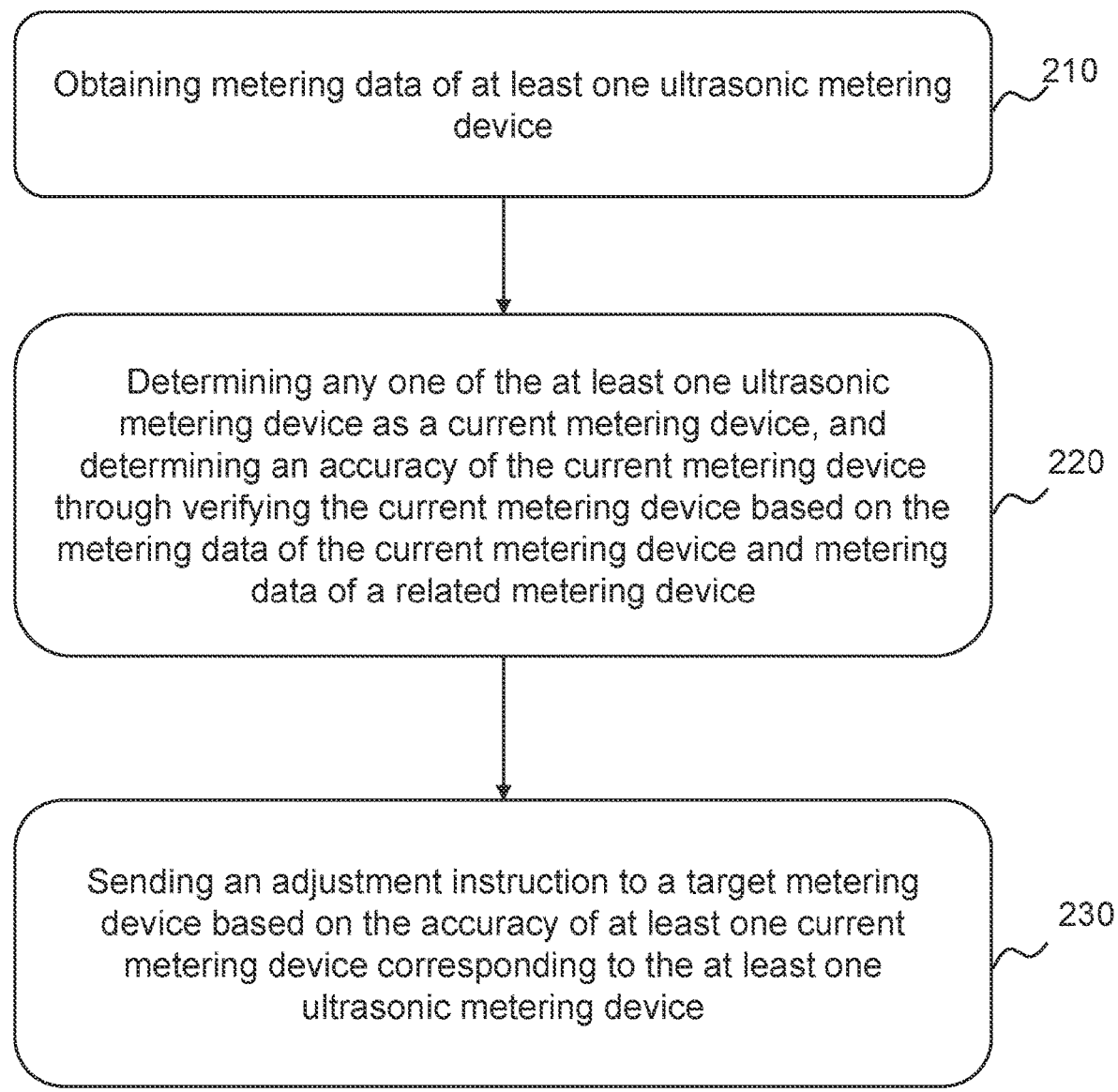
FIG. 2 is an exemplary flowchart of a method for remote control of the ultrasonic metering device according to some embodiments of the present disclosure.

FIG. 2 is an exemplary flowchart of a method for remote control of the ultrasonic metering device according to some embodiments of the present disclosure. In some embodiments, a process 200 may be implemented based on a smart gas device management platform. As shown in FIG. 2, the process 200 includes the following steps.

Step 210, obtaining metering data of at least one ultrasonic metering device.

The at least one ultrasonic metering device may be provided at one or more locations (e.g., at a plurality of gas inlets) in a gas pipeline. The gas inlet of the gas pipeline may include a main gas pipeline inlet, a branch gas pipeline inlet, etc.

The metering data refers to data that characterizes a gas flow in the gas pipeline.

In some embodiments, the metering data may be obtained by monitoring the gas pipeline with the ultrasonic metering devices. The smart gas device management platform may obtain the metering data of different locations of the gas pipeline through the ultrasonic metering devices at the different locations.

Step 220, determining any one of the at least one ultrasonic metering device as a current metering device, and determining an accuracy of the current metering device through verifying the current metering device based on the metering data of the current metering device and metering data of a related metering device.

The related metering device is a metering device provided in a pipeline related with the pipeline where the current metering device is located.

In some embodiments, the related metering device may include at least one of an upper metering device, a lower metering device, and a parallel metering device of the current metering device.

The upper metering device refers to an ultrasonic metering device located in a pipeline upstream of the current metering device. The lower metering device refers to an ultrasonic metering device located in a pipeline downstream of the current metering device.

The parallel metering device refers to a metering device in the pipeline downstream that belongs to a same level as the current metering device and has a same pipeline upstream. For example, a pipeline downstream of a pipeline upstream X has three branches, including metering devices A, B, and C. Taking A as the current metering device, then B and C are the parallel metering devices of the current metering device A.

The accuracy is a degree to which the metering data of the metering device matches an actual gas flow. The accuracy may be expressed as a numerical value as well as a preset level (e.g., level one to level five), the larger the numerical value and preset level, the greater the accuracy.

In some embodiments, the smart gas device management platform may determine the accuracy of the current metering device in a variety of ways. Since metering data of adjacent upper metering devices is equal to (or approximately equal to) a sum of metering data of lower metering devices, the smart gas device management platform may verify the metering data of the current metering device with metering data of lower metering devices corresponding to the current metering device to determine the accuracy of the current metering device, and the smaller the difference between the metering data of the current metering device and the sum of metering data of lower metering devices, the greater the accuracy of the current metering device.

In some embodiments, the smart gas device management platform may perform upstream verification using metering data of the upper metering device, the metering data of the current metering device, and metering data of the parallel metering device during a same time period; and perform downstream verification using the metering data of the lower metering device and the metering data of the current metering device during the same time period. Further, the smart gas device management platform may determine the accuracy of the current metering device based on an upstream verification result and a downstream verification result.

In some embodiments, the upstream verification may be to verify if the difference between the metering data of the upper metering device and the sum of the metering data of the current metering device and the metering data of the parallel metering device for the same time period exceeds a verification error. If the difference exceeds the verification error, the verification fails.

In some embodiments, the downstream verification may be to verify if the difference between the metering data of the current metering device and the sum of the metering data of a plurality of lower metering devices during the same time period exceeds the verification error. If the difference exceeds the verification error, the verification fails.

In some embodiments, the verification error may be related to gas density and gas pressure among the upper metering device, the parallel metering device, and the current metering device. In some embodiments, the verification error may also be related to gas density and gas pressure between the lower metering device and the current metering device. The verification error may be determined by an error evaluation model.

The verification error refers to a maximum value of an allowable error in verifying the current metering data of the measuring device.

The gas density refers to data that characterizes density of gas in the gas pipeline.

The gas pressure refers to data that characterizes pressure of gas in the gas pipeline.

The error evaluation model is a model to determine the verification error. In some embodiments, the error evaluation model may be a machine learning model. For example, the error evaluation model may include a convolutional neural network model, a neural network model, other custom model structures, etc., or any combination thereof.

In some embodiments, an input of the error evaluation model may be the gas density and the gas pressure among the upper metering device, the parallel metering device, and the current metering device, or the gas density and the gas pressure between the lower metering device and the current metering device.

In some embodiments, the input of the error evaluation model may be a sequence. For example, the sequence may be [(a, b), (c, d), (e, f), (g, h)], wherein (a, b) is gas density a and gas pressure b of the pipeline where the current metering device is located, and (c, d), (e, f), and (g, h) are gas density and gas pressure from branch points of the gas pipeline where the three lower metering devices corresponding to the current metering device are located to the respective lower metering devices. The branch points of the gas pipeline are intersections of the pipeline where the current metering device is located and the pipelines where the lower metering devices are located.

In some embodiments, an output of the error evaluation model may be the verification error of the current metering device.

In some embodiments, the error evaluation model may be trained based on a large number of first training samples with a first label. Each set of training samples of the first training samples may include gas density and gas pressure among a sample upper metering device, a sample parallel metering device, and a sample current metering device, or gas density and gas pressure between a sample lower metering device and the sample current metering device. The first label of the first training samples may be verification errors corresponding to the different training samples. In some embodiments, the metering devices corresponding to the first training samples are devices whose accuracies are determined to be qualified after testing, and the first label may be obtained by calculation based on the metering data of the metering devices in a historical record. For example, an error value of the metering data between the metering devices corresponding to the first training samples whose accuracies are determined to be qualified after testing may be determined as the first label corresponding to the first training samples.

The error evaluation model determines the verification error of the current metering device based on the gas density and the gas pressure between the metering devices, improving the accuracy of the determined verification error. It avoids the problems of data inconsistency between upstream and downstream metering devices and misjudging the accuracy of the metering device due to a variation of the gas density and the gas pressure in the pipeline.

The upstream verification result is a result of the verification of the metering data of the upper metering device with the metering data of the current metering device and the parallel metering device. If a difference between the metering data of the upper metering device and the metering data of the current metering device as well as the metering data of the parallel metering device of the current metering device exceeds the verification error, the upstream verification result fails.

The downstream verification result is a result of the verification of the metering data of the current metering device with the metering data of the plurality of lower metering devices. If a difference between the metering data of the current metering device and the metering data of the plurality of lower metering devices exceeds the verification error, the downstream verification result fails.

In some embodiments, in response to both the upstream and downstream verification results passing, the smart gas device management platform determines that the current metering device has a highest accuracy (e.g., level five), i.e., there are no problems with the current metering device.

In some embodiments, in response to both the upstream and downstream verification results failing, the smart gas device management platform determines that the current metering device has a lowest accuracy (e.g., level 1), i.e., there is a problem with the current metering device.

In some embodiments, in response to one of the upstream or the downstream verification results failing, the smart gas device management platform may determine the accuracy of the current metering device based on a corresponding manner described later.

Based on the upstream verification results and downstream verification results, the smart gas device management platform may more comprehensively and accurately determine the accuracy of the current metering device, which helps to further improve the accuracy of a determined adjustment instruction.

In some embodiments, in response to the upstream verification result and the downstream verification result satisfying a preset condition, the smart gas device management platform may verify at least one of the upper metering device, the lower metering device, and the parallel metering device. Further, the smart gas device management platform may determine the accuracy of the current metering device based on the verification result of at least one of the upper metering device, the lower metering device, and the parallel metering device.

The preset condition may be that one of the upstream verification result and the downstream verification result passes and one fails.

In some embodiments, in response to the upstream verification result failing, the smart gas device management platform may continue to perform the upstream verification on the upper metering device and the downstream verification on the parallel metering device. Since the upper metering device has already been verified with the lower metering devices (i.e., the upstream verification of the current metering device has already been performed), only the upstream verification of the upper metering device is required. Since the parallel metering device has already been verified with the upper metering device and the current metering device (i.e., the upstream verification of the current metering device has already been performed), only the downstream verification of the parallel metering device is required. In particular, the upstream verification of the upstream metering device is similar to the upstream verification of the current metering device, and the downstream verification of the parallel metering device is similar to the downstream verification of the current metering device, which may be seen in the relevant description above.

In some embodiments, in response to the upstream verification result of the upper metering device and the downstream verification result of the parallel metering device passing, the smart gas device management platform may consider the current metering device to be potentially problematic and determine that the current metering device has the lowest accuracy (e.g., level 1).

In some embodiments, in response to the upstream verification result of the upper metering device and/or the downstream verification result of the parallel metering device failing, the smart gas device management platform may assume that there may be a problem with at least one of the upper metering device and the parallel metering device, while there may be no problem with the current metering device, and that the current metering device has a high accuracy (e.g., level 4). When the upstream verification result of the upper metering device fails, the smart gas device management platform may continue to perform the upstream verification.

In some embodiments, a count of levels of upstream or downstream verification may be determined by a count of verification steps. For example, if the verification is performed on the upper one level metering device of the current metering device, the verification step is one step up, and if the verification is performed on the upper two levels metering device of the current metering device, the verification step is two steps up. More information about the count of verification steps may be found in the following section.

In some embodiments, in response to the verification result of verification of the two steps up passing, the smart gas device management platform may assume that there may be no problem with the upper two levels metering device of the current metering device, and further determine that there may be a problem with the upper metering device, then the current metering device has a high accuracy (e.g., level four). In response to the verification result of verification of two steps up failing, the smart gas device management platform may assume that there is no problem with the upper metering device of the current metering device, and further determine that there may be a problem with the current metering device and the current metering device has a moderate accuracy (e.g., level 3).

In some embodiments, in response to the downstream verification result failing, the smart gas device management platform may continue to perform the downstream verification on the lower metering device in a similar manner as described above.

The accuracy of the determined accuracy of the current metering device may be improved by further verifying the upper, the lower, or the parallel metering device of the current metering devices to determine whether the upper, the lower, or the parallel metering devices pass the verification and further determine the accuracy of the current metering device.

In some embodiments, a count of verification steps for the upper metering device or the lower metering device may be determined based on a current data upload frequency and a variation parameter of a historical accuracy.

The current data upload frequency is a frequency of data upload of the upper or the lower metering device at a current time.

The historical accuracy is an accuracy of the upper or the lower metering device at a historical time.

The variation parameter is a parameter that characterizes a change between two adjacent historical accuracies, which may include a magnitude of the change, a direction of the change, a count of times of the historical accuracy below an accuracy threshold, etc. The accuracy threshold may be a preset minimum value of the accuracy of the metering device. See FIG. 3 and its related description for more on the variation parameter of the historical accuracy.

In some embodiments, the current data upload frequency may be preset and obtained by the smart gas device management platform, and the variation parameter of the historical accuracy may be obtained through calculation by the smart gas device management platform based on a variation between the two adjacent historical accuracies.

In some embodiments, the count of verification steps may be positively correlated with the current data upload frequency and negatively correlated with the variation parameter of the historical accuracy. For example, the lower the current data upload frequency, the less attention a data center pays to that metering device, the more likely it is that there is a problem with the upper metering device or the lower metering device, and the fewer the verification steps. The smaller the magnitude of change in the variation parameter of the historical accuracy and the fewer times the historical accuracy falls below the accuracy threshold, the less likely it is that there is a problem with the upper metering device or the lower metering device. In view of this, it is necessary to verify the upper one level metering device (or the lower one level metering device) and increase the count of verification steps to make the verification steps greater.

Determining the count of verification steps based on the current data upload frequency and the variation parameter of the historical accuracy may further enable the determined accuracy of the current metering device to be more accurate.

Step 230, sending an adjustment instruction to a target metering device based on the accuracy of at least one current metering device corresponding to the at least one ultrasonic metering device.

The target metering device is a metering device whose accuracy is below the accuracy threshold and may be problematic. More about the accuracy threshold may be found in the relevant description of step 220 above.

The smart gas device management platform may repeat step 220 to determine the accuracies of all or part of the at least one ultrasonic metering device.

The adjustment instruction is an instruction to make an adjustment to the target metering device. For examples, the adjustment instruction includes an instruction to deactivate the target metering device, a data upload frequency instruction to adjust the target metering device (e.g., increase the data upload frequency), a metering parameter instruction to adjust the target metering device, etc. The metering parameter instruction to adjust the target metering device may include adjusting a probe position, calibrating a sound velocity, performing reflection compensation, etc. More about the data upload frequency instruction and the metering parameter instruction may be found in FIG. 3 and its related contents.

The smart gas device management platform may determine the adjustment instruction in a variety of ways. For example, the smart gas device management platform determines an abnormality type of the target metering device based on the historical metering data of the target metering device, and determines the adjustment instructions based on the abnormality type.

Figure 3:
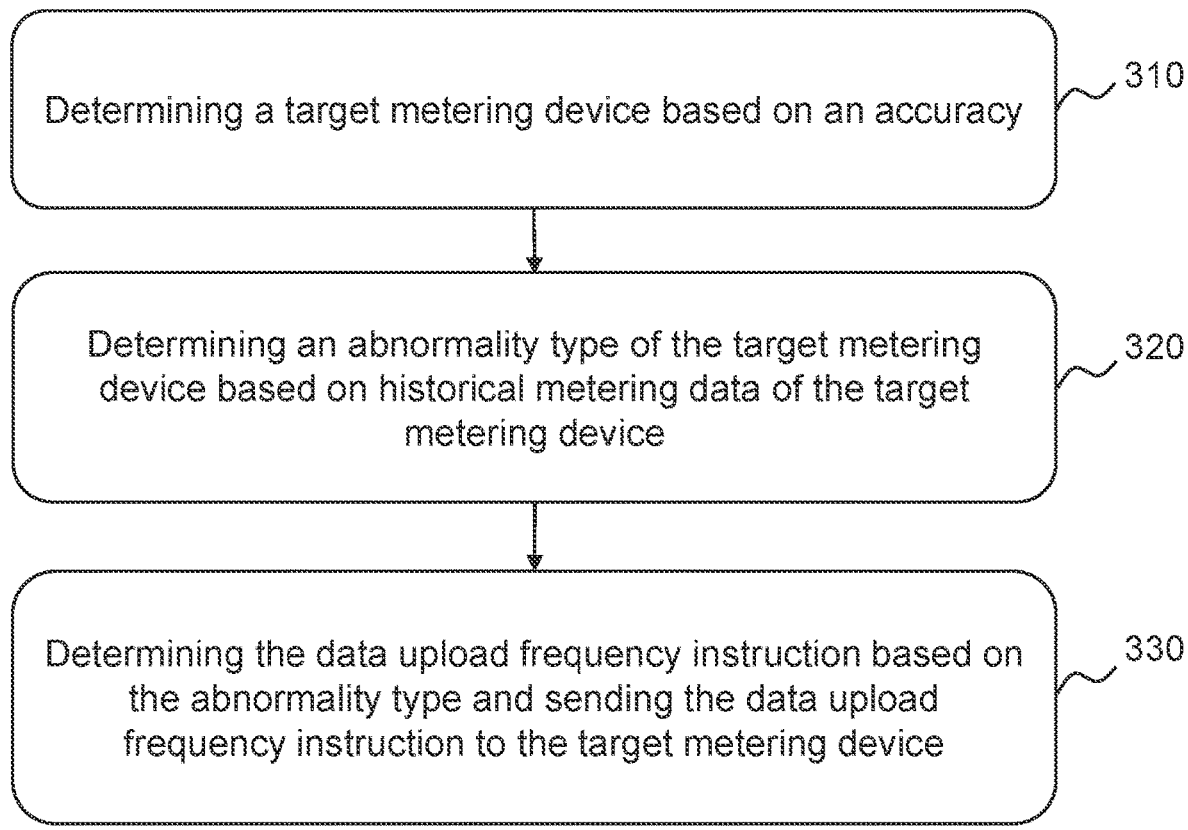
FIG. 3 is an exemplary flowchart of determining an upload frequency instruction according to some embodiments of the present disclosure.

More about determining the data upload frequency instruction and the metering parameter instruction may be found in FIG. 3 and its related contents.

In some embodiments, the smart gas device management platform may send the adjustment instruction to the target metering device through the smart gas sensing network platform based on the smart gas data center.

Through the method for remote control of the ultrasonic metering device, the target metering device may be adjusted more quickly to obtain more accurate metering data, and the metering device may be managed remotely, which improves management efficiency and realizes digitized and intelligent management.

FIG. 3 is an exemplary flowchart of determining an upload frequency instruction according to some embodiments of the present disclosure. In some embodiments, a process 300 may be performed by a smart gas device management platform. As shown in FIG. 3, the process 300 includes the following steps.

In some embodiments, the adjustment instruction may include a data upload frequency instruction. The data upload frequency instruction is used to adjust data upload frequency of a metering device. The data upload frequency refers to a frequency at which the metering device uploads metering data to a smart gas sensing network platform within a preset time. The preset time may be a system default value or an artificially set value. The smart gas device management platform may determine the data upload frequency instruction by following steps 310-330.

Step 310, determining a target metering device based on an accuracy.

More about the accuracy and the target metering device may be found in FIG. 2 and its related contents.

In some embodiments, an accuracy threshold of the metering device is related to a verification error. More about the verification errors may be found in FIG. 2 and its related contents.

In some embodiments, the accuracy threshold is negatively correlated with the verification error. For example, when the verification error is large, it indicates significant fluctuations in gas density and gas pressure in a gas pipeline, resulting in significant fluctuation in gas flow rate within the pipeline. Therefore, the corresponding accuracy threshold for the corresponding metering device may be adjusted to a smaller value.

By considering an impact of the verification error on the accuracy threshold, an impact of the fluctuations of the gas density and the gas pressure during gas transmission in the pipeline on the accuracy of the metering device is reduced.

Step 320, determining an abnormality type of the target metering device based on historical metering data of the target metering device.

The historical metering data refers to metering data within a certain time range before a current time. The time range and the historical metering data may be system default values or artificially set values.

The abnormality type is a type of abnormal accuracy of the target metering device. The abnormality type may include a sporadic abnormality, a non-sporadic abnormality, etc. The sporadic abnormality indicates that the accuracy of the target metering device sporadically falls below the accuracy threshold. The non-sporadic abnormality indicates that the accuracy of the target metering device frequently falls below the accuracy threshold.

In some embodiments, the smart gas device management platform may determine the abnormality type in a variety of ways. For example, the smart gas device management platform may analyze the historical metering data, and if a fluctuation of the historical metering data is greater than a fluctuation threshold, it indicates that the accuracy of the metering data is low due to fluctuation of a gas flow, and the abnormality type of the target metering device is determined to be the sporadic abnormality. On the contrary, if the fluctuation of the historical metering data is less than the fluctuation threshold, it indicates that the target metering device may be faulty, and the abnormality type of the target metering device is determined to be the non-sporadic abnormality.

The fluctuation threshold may be a system default value or an artificially set value. The fluctuation of the historical metering data is an amount of change in gas flow data over a certain time period. For example, the fluctuation of the historical metering data may include a standard deviation of the gas flow data over the certain time period.

In some embodiments, the smart gas device management platform may determine a plurality of historical accuracies of a target metering device based on the historical metering data. The smart gas device management platform may calculate variation parameters of the plurality of historical accuracies, wherein the variation parameters include a magnitude and a direction of changes between adjacent historical accuracies, and a count of times of the historical accuracies below an accuracy threshold. The smart gas device management platform may determine the abnormality type of the target metering device based on the variation parameters and the current accuracy of the target metering device.

More about the historical accuracy may be found in FIG. 2 and its related contents.

In some embodiments, the smart gas device management platform may determine the historical accuracy based on the historical metering data in a similar manner to upstream verification and downstream verification. More about the upstream verification and the downstream verification may be found in FIG. 2 and its related contents.

The current accuracy is an accuracy at a current moment.

In some embodiments, when the current accuracy is lower than the accuracy threshold, the smart gas device management platform may analyze the historical accuracies, and in response to the magnitude of change between the historical accuracies is less than a magnitude of change threshold, and the count of times of the historical accuracies below the accuracy threshold is less than a count of times threshold, determine the abnormality type to be the sporadic abnormality. Conversely, the abnormality type is most likely to be the non-sporadic abnormality.

The magnitude of change threshold and the count of times threshold may be determined empirically or experimentally.

By calculating the variation parameters of the plurality of historical accuracies to determine the abnormality type of the target metering device, more accurate results may be obtained compared to empirical judgment, which contributes to improving accuracy in determining the data upload frequency instruction subsequently.

Step 330, determining the data upload frequency instruction based on the abnormality type and sending the data upload frequency instruction to the target metering device.

In some embodiments, the smart gas device management platform may determine the data upload frequency instruction for the target metering device in a variety of ways based on the abnormality type. For example, when the abnormality type is the sporadic abnormality, the data upload frequency of the target metering device is increased by a small amount, and the data upload frequency instruction is restored to the data upload frequency before the increase when the accuracy of the adjusted target metering device is monitored to be greater than the accuracy threshold. As another example, when the abnormality type is the non-sporadic abnormality, the data upload frequency of the target metering device is increased by a large amount and the metering parameter of the target metering device is also adjusted, and the data upload frequency instruction is restored to the data upload frequency before the increase when the accuracy of the adjusted target metering device is monitored to be greater than the accuracy threshold. More about adjusting the metering parameter of the target metering device may be found in FIG. 3 and its related contents below. The small amount and the large amount may be preset adjustment amounts.

By determining the abnormality type of the target metering device and determining the data upload frequency instruction, operating parameters of the target metering device may be adjusted in a targeted manner to improve accuracy and reliability of data upload.

In some embodiments, the smart gas device management platform may determine the metering parameter instruction of the target metering device based on steps S11-S13 as follows.

The metering parameters refer to parameters that affect the metering accuracy of the ultrasonic metering device. For example, the metering parameters may include a probe position metering parameter, a sound velocity calibration metering parameter, a reflection compensation metering parameter, a signal processing metering parameter, a temperature compensation metering parameter, a pressure compensation metering parameter, etc.

The probe position metering parameter refers to a parameter corresponding to a position of a probe of the ultrasonic metering device within a fluid pipeline.

The sound velocity calibration metering parameter refers to a parameter corresponding to a velocity of ultrasonic waves propagating in a fluid. The velocity of ultrasonic waves propagating in the different fluids varies at different temperatures.

The reflection compensation parameter refers to a compensation parameter related with the reflection of ultrasonic waves when encountering various obstacles (e.g., bubbles or sediments) in the fluid.

The signal processing metering parameter refers to a parameter related with the processing of received signals by the ultrasonic metering device. For example, the processing of signals includes filtering, gain adjustment, time delay, and other processing of the signals.

The temperature compensation metering parameter refers to a compensation parameter related with temperature changes.

The pressure compensation metering parameter refers to a compensation parameter related with pressure changes of fluid.

In some embodiments, the smart gas device management platform may improve the metering accuracy by adjusting the metering parameters of the target metering device.

The metering parameter instruction refers to an instruction to adjust the metering parameters of the ultrasonic metering device. For example, the metering parameter instruction may include instructions for adjusting at least one of the probe position metering parameter, the sound velocity calibration metering parameter, the reflection compensation metering parameter, the signal processing metering parameter, the temperature compensation metering parameter, the pressure compensation metering parameter, etc.

Step S11, in response to the abnormality type being the non-sporadic abnormality, obtaining an error direction of the target metering device.

The error direction refers to a direction of deviation of the metering data of the target metering device compared to metering data of a corresponding metering device. The corresponding metering device may be an upper metering device or a plurality of lower metering devices or parallel metering devices. For example, the error direction may include relatively large, relatively small, etc.

For example, in response to the metering data of the upper metering device being greater than a sum of the metering data of the current metering device and the metering data of the parallel metering device of the current metering device, the smart gas device management platform determines the error direction as relatively small.

For example, in response to the metering data of the plurality of lower metering devices being greater than the metering data of the current metering device, the smart gas device management platform determines the error direction as relatively small.

Step S12, predicting suspicious abnormal parameter based on the error direction, the historical metering data, pipeline parameters, and current metering parameters of the target metering device.

More about the historical metering data may be found in FIG. 3 and its related contents above.

The pipeline parameters are parameters related with the natural gas transmission pipeline itself. For example, the pipeline parameters may include a material, an inner diameter, an outer diameter, etc., of the pipeline.

The current metering parameters refer to metering parameters of the target metering device at the current moment. More about the current metering parameters may be found in FIG. 4 and its related contents.

The suspicious abnormal parameter refers to one or more metering parameters that may cause a degradation in the accuracy of the target metering device.

In some embodiments, the smart gas device management platform may determine the suspicious abnormal parameter in a variety of ways. For example, a smart gas device management platform may construct a feature vector based on the error direction, the historical metering data, the pipeline parameters, and the current metering parameters of the target metering device. The smart gas device management platform may search in a vector database based on the feature vector, determine a reference feature vector that satisfies a preset matching condition as a related feature vector, and determine a reference suspicious abnormal parameter corresponding to the related feature vector as the current suspicious abnormal parameter. The preset matching condition refers to a judgment condition for determining the related feature vector. In some embodiments, the preset matching condition may include that a vector distance is smaller than a distance threshold, the vector distance is the smallest, or the like.

Figure 4:
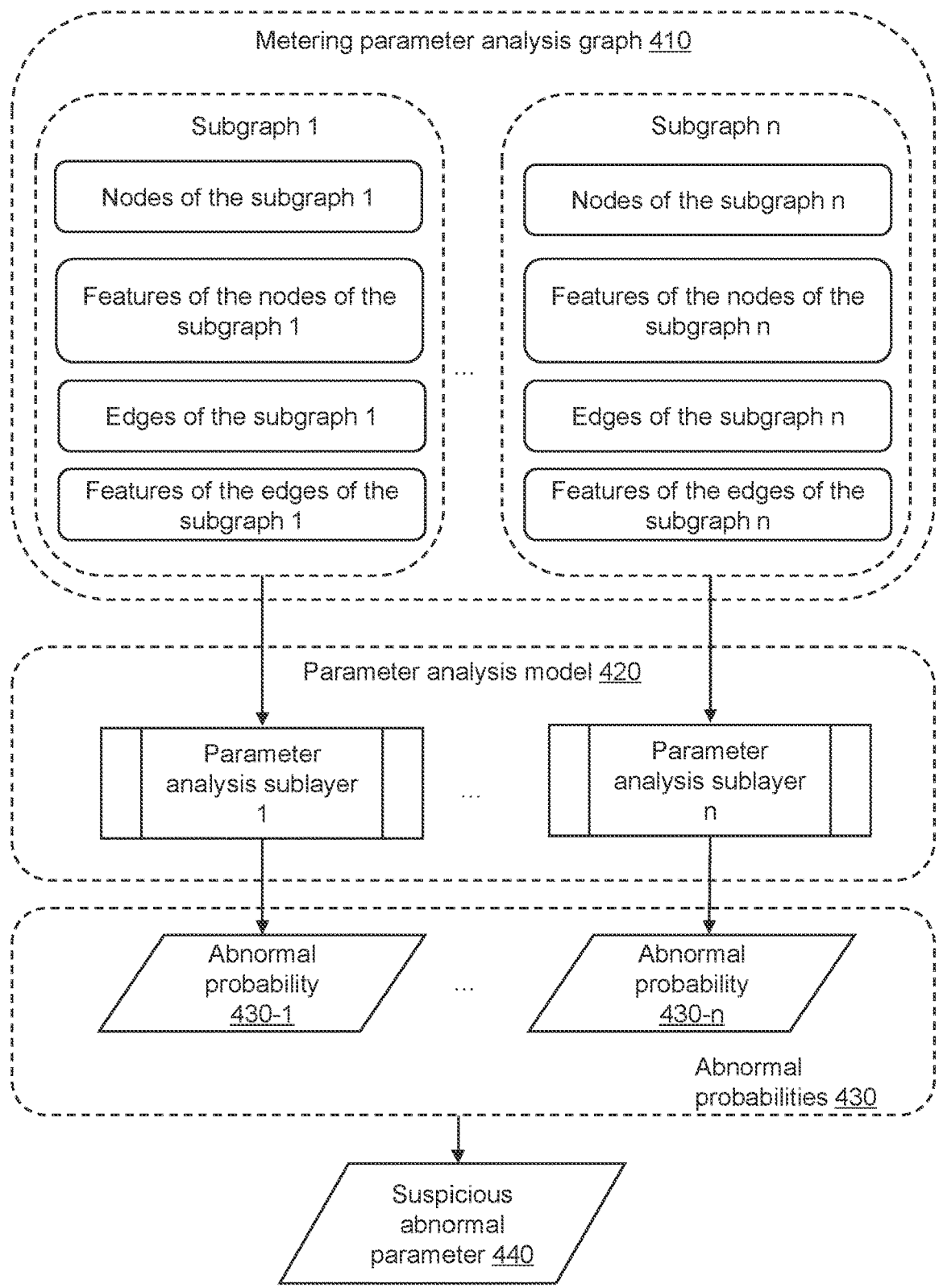
FIG. 4 is an exemplary schematic diagram of determining a suspicious abnormal parameter according to some embodiments of the present disclosure.

In some embodiments, the smart gas device management platform may predict, based on a metering parameter analysis graph, abnormal probabilities of a plurality of current metering parameters through a parameter analysis model, and thus determine the suspicious abnormal parameter, more of which may be found in the relevant description of FIG. 4 and its related contents.

Step S13, determining the metering parameter instruction of the target metering device based on the suspicious abnormal parameter.

In some embodiments, the smart gas device management platform may determine the metering parameter instruction of the target metering device in a variety of ways based on the suspicious abnormal parameter. The smart gas device management platform may preset a comparison table among the error direction, the suspicious abnormal parameter, and an adjusted metering parameter, determine the adjusted metering parameter by looking up the table, and determine the metering parameter instruction of the target metering device based on the adjusted metering parameter.

By predicting the suspicious abnormal parameter, it may avoid simultaneous adjustment of all metering parameters of the target metering device, saving computational resources while improving the efficiency and accuracy of the adjustment.

In some embodiments, the metering parameter instructions may include a probing parameter instruction and a target parameter instruction. The smart gas device management platform may perform a probing adjustment on the target metering device based on the probing parameter instruction; and determine the target parameter instruction based on an adjustment effect of the target metering device.

The probing parameter instruction refers to an instruction to perform a probing adjustment on the suspicious abnormal parameter of the target metering device. For example, the probing adjustment instruction may include an adjusting direction, etc., and the adjusting direction may include increasing or decreasing the suspicious abnormal parameter.

In some embodiments, the smart gas device management platform may perform the probing adjustment on the target metering device (e.g., increasing the suspicious abnormal parameter by a small amount) and re-evaluate the accuracy of the target metering device after the adjustment to determine changes in the accuracy of the target metering device. If the accuracy is not increased or the accuracy decreases, the smart gas device management platform may change the adjustment direction of the probing parameter instruction (e.g., decreasing the suspicious abnormal parameter by a small amount) and perform the probing adjustment on the target metering device again.

In some embodiments, the probing parameter instruction probes one suspicious abnormal parameter at a time to accurately determine an effective adjustment direction for each suspicious abnormal parameter.

The effective adjustment direction refers to a direction of adjustment that improves the accuracy.

In some embodiments, the smart gas device management platform may probe one suspicious abnormal parameter and re-evaluate the accuracy of the target metering device after adjustment to determine if the accuracy of the target metering device exceeds a first improvement magnitude threshold. If the accuracy of the target metering device exceeds the first improvement magnitude threshold, the current adjustment direction is determined to be the effective adjustment direction. The first improvement magnitude threshold may be an artificially set value or a system preset value.

Probing only one suspicious abnormal parameter at a time may improve the pertinence and accuracy of the adjustment, and help improve subsequent determination of the target parameter instruction. This avoids the situation where the suspicious abnormal parameter that causes a change of the accuracy may not be accurately located when performing the probing adjustment on a plurality of suspicious abnormal parameters at a same time.

The adjustment effect of the target metering device may be an improvement magnitude of the accuracy of the target metering device after the adjustment. The greater the improvement magnitude, the better the adjustment effect. Conversely, the smaller the improvement magnitude, the worse the adjustment effect.

The target parameter instruction refers to an adjustment instruction for the target metering parameter that enables the adjustment effect to achieve a desired target. The desired target may be an artificially set value.

In some embodiments, the smart gas device management platform may determine the target parameter instruction based on the adjustment effect (e.g., the improvement magnitude of the accuracy) of the target metering device. For example, a probing parameter instruction with a largest improvement magnitude among a plurality of probing parameter instructions may be determined as the target parameter instruction.

Determining the target parameter instruction based on the adjustment effect of the target metering device corresponding to the probing parameter instruction may make the target parameter instruction more targeted and accurate, and further improve the adjustment effect of the target parameter instruction.

FIG. 4 is an exemplary schematic diagram of determining a suspicious abnormal parameter according to some embodiments of the present disclosure.

In some embodiments, the smart gas device management platform may construct a metering parameter analysis graph 410 based on a gas pipeline network.

The metering parameter analysis graph refers to a graph that represents a relationship between individual ultrasonic metering devices. In some embodiments, the metering parameter analysis graph is a data structure consisting of nodes and edges, where the edges connect the nodes, and the nodes have features corresponding to the nodes and the edges have features corresponding to the edges.

In some embodiments, there is the following situation that a deviation of the metering data of an individual metering device is within an allowable range, but there may be a large cumulative error when the upper and lower metering devices are considered together. Therefore, an overall error of a plurality of metering devices needs to be considered comprehensively through the metering parameter analysis graph. For example, the metering parameters of the upper metering device are small, the metering parameters of the lower metering device are large, and the metering error caused by individual metering parameters is within the allowable range, but the cumulative metering error is large. Therefore, a complex relationship between the metering devices may be analyzed by the metering parameter analysis graph, and the metering parameters of each metering device may be analyzed by taking the metering device with a high accuracy as a benchmark to determine abnormal metering parameters and adjust the abnormal metering parameters, so as to ensure that the overall error of the plurality of metering devices in the pipeline meets a requirement.

In some embodiments, the metering parameter analysis graph 410 includes a plurality of subgraphs, e.g., a subgraph 1, a subgraph n, etc. The subgraph 1 may include nodes of the subgraph 1, features of the nodes of the subgraph 1, edges of the subgraph 1, and features of the edges of the subgraph 1. The subgraph n may include nodes of the subgraph n, features of the nodes of the subgraph n, edges of the subgraph n, and features of the edges of the subgraph n.

The features of the nodes of each subgraph reflect different current metering parameters. The current metering parameters differ for different subgraphs. More about the current metering parameters may be found in the relevant description in FIG. 3.

The nodes of the metering parameter analysis graph include ultrasonic metering devices. The features of the nodes may reflect information related with the ultrasonic metering devices. For example, the features of the node may include a model, accuracy, an error direction, and the current metering parameters of the ultrasonic metering devices.

More about the error direction may be found in FIG. 3 and its related contents. More about the ultrasonic metering devices and their accuracy may be found in FIG. 2 and its related contents.

The current metering parameters may be one kind of metering parameter or a combination of a plurality of metering parameters determined according to a physical correlation between different metering parameters or a preset rule. For example, in the case of limited volume, if the pressure of gas on a vessel wall increases, the temperature increases due to a constant force area. Therefore, a temperature compensation metering parameter and a pressure compensation metering parameter may be determined as a set of current metering parameters. As another example, considering that a sound speed is related to a temperature of fluid, the temperature compensation metering parameter and a sound speed calibration metering parameter may be determined as a set of current metering parameters. As shown in FIG. 4, the features of the nodes in the subgraph correspond to the set of current metering parameters.

In some embodiments, the smart gas device management platform may set the error direction of a node whose accuracy is higher than a preset value as 0. The error direction of the nodes whose accuracy is lower than the preset value is set according to a result of manual verification, and the verification result is marked as positive if the error direction is relatively large, and marked as negative if the error direction is relatively small. The preset value may be a value set based on experience or set manually. The content of the error direction being relatively large and relatively small may be seen in FIG. 3.

The edges of the metering parameter analysis graph represent gas pipelines between the ultrasonic metering devices. For example, the edge exists between two nodes directly connected by the gas pipeline. The features of the edges may reflect information related to the gas pipeline and the fluid transported in the gas pipeline. For example, the features of the edges may include a length of the pipeline, density of the gas in the pipeline, gas pressure, a gas temperature, etc. More about the gas density, the gas pressure, and the gas temperature may be found in FIG. 2 and its related contents.

The features of the nodes and the features of the edges may be determined in various ways based on underlying data. A source of the data may be the ways illustrated in other embodiments or other ways. The data may include current data, historical data, etc. For example, data such as the gas density, the gas pressure, and the gas temperature may be obtained based on sensors in the pipeline. The smart gas device management platform may compile a sequence of data from a plurality of sensors, and the sequence may include a sensor type, a sensor location, a sensor reading, etc.

In some embodiments, the smart gas device management platform may predict abnormal probabilities 430 of the set of current metering parameters (e.g., abnormal probability 430-1, abnormal probability 430-n, etc.) of the features of the nodes of different subgraphs respectively based on the metering parameter analysis graph 410 (a plurality of subgraphs) through a plurality of parameter analysis sublayers of a parameter analysis model 420. The abnormal probabilities 430 may include a probability for each current metering parameter of the set of current metering parameters.

In some embodiments, the parameter analysis model may be a Graph Neural Network (GNN) model, or other graph models, such as a Graph Convolutional Neural Network (GCNN) model, or a graph neural network model with other processing layers, modified processing techniques, etc.

In some embodiments, the plurality of parameter analysis sublayers may include parameter analysis sublayer 1, parameter analysis sublayer n, etc.

In some embodiments, the abnormal probabilities of the set of current metering parameters output by the parameter analysis sublayers correspond to nodes of ultrasonic metering devices with accuracies lower than an accuracy threshold and a cause of the abnormality of the ultrasonic metering device is non-sporadic. The smart gas device management platform may mark in advance nodes that need to be output and nodes that do not need to be output respectively in the metering parameter analysis graph 410.

In some embodiments, the smart gas device management platform may determine the suspicious parameters based on the abnormal probabilities of a plurality of sets of current metering parameters. For example, the smart gas device management platform may determine current metering parameters whose abnormal probabilities are higher than a probability threshold as the suspicious abnormal parameter 440. The probability threshold may be a system preset value or artificially set value.

In some embodiments, the parameter analysis model may be obtained based on training data. The training data includes second training samples and second labels. For example, the second training samples may include a historical parameter analysis graph, and each historical parameter analysis graph may include a plurality of historical subgraphs. Each second training sample is labeled with corresponding preset nodes. The second label indicates whether the current metering parameters corresponding to the preset nodes in each historical subgraph are actually abnormal (a label of 1 indicates abnormal, and a label of 0 indicates non-abnormal). The second training samples may be determined based on historical data and the second labels may be determined by the smart gas device management platform or human labeling. The preset nodes may be nodes for which the accuracy of the corresponding ultrasonic metering devices is below the accuracy threshold.

By utilizing the parameter analysis graph and the complex physical correlation, the parameter analysis model may accurately predict the abnormal probabilities of the current metering parameters, allowing for accurate determination of the suspicious abnormal parameter and energy savings.

One or more embodiments of the present disclosure also provide a non-transitory, computer-readable storage medium, wherein the storage medium stores computer instructions, and when a computer reads the computer instructions in the storage medium, the computer runs the method for remote control of the ultrasonic metering device as described in the embodiments of the present disclosure.

The basic concepts have been described above, and it is clear that the above detailed disclosure is intended as an example only for those skilled in the art and does not constitute a limitation of the present disclosure. Although not explicitly stated herein, there are various modifications, improvements, and amendments that may be made to the present disclosure by those skilled in the art. Such modifications, improvements, and amendments are suggested in the present disclosure, so such modifications, improvements, and amendments remain within the spirit and scope of the exemplary embodiments of the present disclosure.

Also, the present disclosure uses specific words to describe embodiments of the present disclosure. For example, "one embodiment," "an embodiment," and/or "some embodiments" mean that a certain feature, structure, or characteristic is connected with at least one embodiment of the present disclosure. Therefore, it should be emphasized and noted that "one embodiment" or "an embodiment" or "an alternative embodiment" mentioned twice or more in different places in the present disclosure does not necessarily refer to the same embodiment. In addition, certain features, structures, or characteristics of one or more embodiments of the present disclosure may be suitably combined.

In closing, it is to be understood that the embodiments of the present disclosure disclosed herein are illustrative of the principles of the embodiments of the present disclosure. Other variations may also fall within the scope of the present disclosure. Therefore, merely by way of example and not limitation, alternative configurations of the embodiments of the present disclosure may be considered consistent with the teachings of the present disclosure. Accordingly, the embodiments of the present disclosure are not limited to the embodiments explicitly introduced and described in the present disclosure.

What is claimed is:

1. A method for remote control of an ultrasonic metering device, wherein the method is implemented by a smart gas device management platform of an Internet of Things (IoT) system for remote control of the ultrasonic metering device, and the method comprises:
    obtaining metering data of at least one ultrasonic metering device;
    determining any one of the at least one ultrasonic metering device as a current metering device;
    determining an accuracy of the current metering device through verifying the current metering device based on metering data of the current metering device and metering data of a related metering device, wherein the related metering device includes at least one of an upper metering device, a lower metering device, and a parallel metering device of the current metering device; and
    sending an adjustment instruction to a target metering device based on the accuracy of at least one current metering device corresponding to the at least one ultrasonic metering device, wherein the adjustment instruction includes a metering parameter instruction, and the metering parameter instruction is determined based on operations including:
        in response to an abnormality type being a non-sporadic abnormality, obtaining an error direction of the target metering device;
        predicting a suspicious abnormal parameter based on the error direction, the historical metering data, pipeline parameters, and current metering parameters of the target metering device; and
        determining the metering parameter instruction of the target metering device based on the suspicious abnormal parameter; wherein the predicting a suspicious abnormal parameter based on the error direction, the historical metering data, pipeline parameters, and current metering parameters of the target metering device includes:
            constructing a metering parameter analysis graph based on a gas pipeline network, wherein the metering parameter analysis graph includes a plurality of subgraphs, and nodes of the metering parameter analysis graph include the ultrasonic metering devices, and features of the nodes include models of the ultrasonic metering devices, the accuracy, the error direction, and the current metering parameters, the plurality of subgraphs having different current metering parameters, and edges of the metering parameter analysis graph represent gas pipelines between the ultrasonic metering devices, and features of the edges include pipeline lengths, gas density in the pipelines, gas pressure, and gas temperatures;
            predicting, based on the metering parameter analysis graph, abnormal probabilities of a plurality of current metering parameters through a parameter analysis model, the parameter analysis model being a machine learning model; and
            determining the suspicious abnormal parameter based on the abnormal probabilities of the plurality of current metering parameters; and
        the metering parameter instruction includes a probing parameter instruction and a target parameter instruction, wherein the target parameter instruction is obtained based on operations including:
            performing a probing adjustment on the target metering device based on the probing parameter instruction, wherein the probing parameter instruction performs only one probing adjustment on one suspicious abnormal parameter at a time; and
            determining the target parameter instruction based on an adjustment effect of the target metering device.

2. The method according to claim 1, wherein the determining an accuracy of the current metering device through verifying the current metering device based on the metering data of the current metering device and metering data of a related metering device comprises:
    performing upstream verification using metering data of the upper metering device, metering data of the current metering device, and metering data of the parallel metering device during a same time period;
    performing downstream verification using metering data of the lower metering device and the metering data of the current metering device during the same time period; and
    determining the accuracy of the current metering device based on an upstream verification result and a downstream verification result.

3. The method according to claim 2, wherein the determining the accuracy of the current metering device based on an upstream verification result and a downstream verification result includes:
    in response to the upstream verification result and the downstream verification result satisfying a preset condition, performing verification on the at least one of the upper metering device, the lower metering device, or the parallel metering device; and
determining the accuracy of the current metering device based on a verification result of the at least one of the upper metering device, the lower metering device, or the parallel metering device.

4. The method according to claim 1, wherein the adjustment instruction includes a data upload frequency instruction, and the sending the adjustment instruction to a target metering device based on the accuracy of at least one current metering device corresponding to the at least one ultrasonic metering device includes:
determining the target metering device based on the accuracy, wherein an accuracy of the target metering device is lower than an accuracy threshold;
determining an abnormality type of the target metering device based on historical metering data of the target metering device; and
determining the data upload frequency instruction based on the abnormality type and sending the data upload frequency instruction to the target metering device.

5. An Internet of Things (IoT) system for remote control of an ultrasonic metering device, wherein the IoT system includes a smart gas user platform, a smart gas service platform, a smart gas device management platform, a smart gas sensing network platform, and a smart gas object platform;
the smart gas user platform includes a plurality of smart gas user sub-platforms;
the smart gas service platform includes a plurality of smart gas service sub-platforms;
the smart gas device management platform includes a plurality of smart gas device management sub-platforms and a smart gas data center, the smart gas device management platform being configured to transmit an adjustment instruction to the smart gas sensing network platform via the smart gas data center;
the smart gas sensing network platform is configured to interact with the smart gas data center and the smart gas object platform and send the adjustment instruction to the smart gas object platform;
the smart gas object platform is configured to obtain metering data of at least one ultrasonic metering device;
the smart gas device management platform is configured to:
determine any one of the at least one ultrasonic metering device as a current metering device;
determine an accuracy of the current metering device through verifying the current metering device based on metering data of the current metering device and metering data of a related metering device, wherein the related metering device includes at least one of an upper metering device, a lower metering device, and a parallel metering device of the current metering device; and
send the adjustment instruction to a target metering device based on the accuracy of at least one current metering device corresponding to the at least one ultrasonic metering device, wherein the adjustment instruction includes a metering parameter instruction, and the smart gas device management platform is further configured to:
in response to an abnormality type being a non-sporadic abnormality, obtain an error direction of the target metering device;
predict a suspicious abnormal parameter based on the error direction, the historical metering data, pipeline parameters, and current metering parameters of the target metering device; and
determine the metering parameter instruction of the target metering device based on the suspicious abnormal parameter;
the smart gas device management platform is further configured to:
construct a metering parameter analysis graph based on a gas pipeline network, wherein the metering parameter analysis graph includes a plurality of subgraphs, and nodes of the metering parameter analysis graph include the ultrasonic metering devices, and features of the nodes include models of the ultrasonic metering devices, the accuracy, the error direction, and the current metering parameters, the plurality of subgraphs having different current metering parameters, and edges of the metering parameter analysis graph represent gas pipelines between the ultrasonic metering devices, and features of the edges include pipeline lengths, gas density in the pipelines, gas pressure, and gas temperatures;
predict, based on the metering parameter analysis graph, abnormal probabilities of a plurality of current metering parameters through a parameter analysis model, the parameter analysis model being a machine learning model; and
determine the suspicious abnormal parameter based on the abnormal probabilities of the plurality of current metering parameters; and
the metering parameter instruction includes a probing parameter instruction and a target parameter instruction, wherein the smart gas device management platform is further configured to:
perform a probing adjustment on the target metering device based on the probing parameter instruction, wherein the probing parameter instruction performs only one probing adjustment on one suspicious abnormal parameter at a time; and
determine the target parameter instruction based on an adjustment effect of the target metering device.

6. The IoT system according to claim 5, wherein the smart gas device management platform is further configured to:
perform upstream verification using metering data of the upper metering device, metering data of the current metering device, and metering data of the parallel metering device during a same time period;
perform downstream verification using metering data of the lower metering device and the metering data of the current metering device during the same time period; and
determine the accuracy of the current metering device based on an upstream verification result and a downstream verification result.

7. The IoT system according to claim 6, wherein the smart gas device management platform is further configured to:
in response to the upstream verification result and the downstream verification result satisfying a preset condition, perform verification on at least one of the upper metering device, the lower metering device, or the parallel metering device; and
determine the accuracy of the current metering device based on a verification result of the at least one of the upper metering device, the lower metering device, or the parallel metering device.

8. The IoT system according to claim 5, wherein the adjustment instruction includes a data upload frequency instruction, and the smart gas device management platform is further configured to:
   determine the target metering device based on the accuracy, wherein an accuracy of the target metering device is lower than an accuracy threshold;
   determine an abnormality type of the target metering device based on historical metering data of the target metering device; and
   determine the data upload frequency instruction based on the abnormality type and send the data upload frequency instruction to the target metering device.

* * * * *